(12) United States Patent
Earanky

(10) Patent No.: US 9,843,279 B2
(45) Date of Patent: Dec. 12, 2017

(54) PHASE CURRENT DETECTION SYSTEM

(71) Applicant: Regal Beloit America, Inc., Beloit, WI (US)

(72) Inventor: Vijay K. Earanky, Troy, OH (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 14/995,776

(22) Filed: Jan. 14, 2016

(65) Prior Publication Data
US 2016/0134215 A1    May 12, 2016

Related U.S. Application Data

(63) Continuation of application No. 14/035,465, filed on Sep. 24, 2013, now Pat. No. 9,240,751.

(51) Int. Cl.
*H02H 7/08* (2006.01)
*H02P 6/18* (2016.01)
*H02P 29/024* (2016.01)

(52) U.S. Cl.
CPC ............ *H02P 6/18* (2013.01); *H02P 29/0241* (2016.02)

(58) Field of Classification Search
USPC ........ 318/400.21, 400.26, 720, 801, 400.17; 361/18, 90, 91.1, 91.5, 91.6; 324/202
See application file for complete search history.

(56) References Cited

U.S. PATENT DOCUMENTS

| | | | |
|---|---|---|---|
| 5,510,947 A * | 4/1996 | Pellegrini | ........... H01L 27/0248 257/355 |
| 5,744,921 A | 4/1998 | Makaran | |
| 6,683,435 B1 * | 1/2004 | Liang | ................... B60L 3/0023 318/400.01 |
| 7,221,121 B2 | 5/2007 | Skaug et al. | |
| 7,233,125 B2 | 6/2007 | Ramamoorthy et al. | |
| 7,262,947 B2 | 8/2007 | Heravi et al. | |
| 7,265,516 B2 | 9/2007 | LaCroix | |
| 7,301,298 B2 | 11/2007 | Shao et al. | |
| 7,538,500 B2 | 5/2009 | Moller et al. | |

(Continued)

FOREIGN PATENT DOCUMENTS

| | | |
|---|---|---|
| CA | 2413865 | 6/2003 |
| CA | 2652066 | 6/2003 |

(Continued)

OTHER PUBLICATIONS

Office Action from the U.S. Patent and Trademark Patent Office for U.S. Appl. No. 14/035,465, dated Sep. 14, 2015 (9 pages).

*Primary Examiner* — Jorge L Carrasquillo
(74) *Attorney, Agent, or Firm* — Michael Best & Friedrich LLP

(57) ABSTRACT

A motor control system includes an inverter and a plurality of current sensors each positioned in-line between the inverter and a phase coil of the motor. Each current sensor measures the current provided to each phase coil of the motor and provides a signal indicative of each phase current to a controller. In some embodiments, the currents sensors are provided as one or more current sense integrated circuits. A protection circuit protects the current sense integrated circuit from ground bounce by coupling a diode and an opposite facing Zener diode in series between the power supply pin and the ground pin of the integrated circuit.

10 Claims, 3 Drawing Sheets

(56) References Cited

U.S. PATENT DOCUMENTS

| | | |
|---|---|---|
| 7,622,885 B2 | 11/2009 | LaCroix |
| 2003/0057899 A1 | 3/2003 | LaCroix |
| 2003/0063900 A1 | 4/2003 | Wang et al. |
| 2004/0105664 A1 | 6/2004 | Ivankovic |
| 2004/0227476 A1* | 11/2004 | Guerra .................. H02P 27/08 318/400.28 |
| 2005/0068001 A1 | 3/2005 | Skaug et al. |
| 2005/0211966 A1 | 9/2005 | Heravi et al. |
| 2006/0152181 A1 | 7/2006 | Shao et al. |
| 2007/0046248 A1 | 3/2007 | Ramamoorthy et al. |
| 2008/0024084 A1 | 1/2008 | LaCroix |
| 2008/0037807 A1* | 2/2008 | Honda .................... H03F 1/52 381/120 |
| 2008/0272715 A1 | 11/2008 | Moller et al. |
| 2009/0027814 A1 | 1/2009 | Meid |
| 2009/0133947 A1* | 5/2009 | Yoshihara ............... B60K 6/48 180/65.285 |
| 2011/0109255 A1 | 5/2011 | Bonvin et al. |
| 2011/0174795 A1 | 7/2011 | Chen et al. |
| 2012/0014027 A1* | 1/2012 | Lin ....................... H02H 9/046 361/111 |
| 2014/0184200 A1* | 7/2014 | Milano ................ G01R 33/072 324/202 |

FOREIGN PATENT DOCUMENTS

| | | |
|---|---|---|
| CN | 100334802 | 8/2007 |
| CN | 1075282 | 11/2011 |
| EP | 1446869 | 5/2003 |
| EP | 1320184 | 6/2003 |
| EP | 0896760 | 2/2004 |
| WO | 9742701 | 11/1997 |
| WO | 03044939 | 5/2003 |

* cited by examiner

PHASE CURRENT DETECTION SYSTEM

CROSS-REFERENCE TO RELATED APPLICATIONS

This application is a continuation of U.S. patent application Ser. No. 14/035,465 filed Sep. 24, 2013, now U.S. Pat. No. 9,240,751. This application is incorporated herein by reference in its entirety.

BACKGROUND

The present invention relates to systems and methods for controlling the operation of an electric motor based on monitored phase currents.

SUMMARY

In one embodiment, the invention provides a motor control system that includes an inverter and a plurality of current sensors each positioned in-line between the inverter and a phase coil of the motor. Each current sensor measures the current provided to each phase coil of the motor and provides a signal indicative of each phase current to a controller. In some embodiments, the currents sensors are provided as one or more current sense integrated circuits. A protection circuit protects the current sense integrated circuit from ground bounce by coupling a diode and an opposite facing Zener diode in series between the power supply pin and the ground pin of the integrated circuit.

In another embodiment, the invention provides a motor control system comprising a three-phase inverter. The three-phase inverter includes a first high-side switch and a first low-side switch arranged in series between a power supply and ground. A first node between the first high-side switch and the first low-side switch is couplable to a first phase coil of an electronically commutated motor. A second node between a second high-side switch and a second low-side switch is couplable to a second phase coil of the motor and a third node between the third high-side switch and the third low-side switch is couplable to a third phase coil of the motor. A first, second, and third current sensor are coupled between the motor and the first node, second node, and third node, respectively. A controller is configured to receive a signal from each current sensor and control the inverter to control the motor based on the measured phase currents.

In yet another embodiment, the invention provides a phase current monitoring system for an electronically commutated motor. The phase current monitoring system includes a first current sense integrated circuit coupled between a first node and a first phase coil of the motor. The first node is between a first phase high-side switch and a first phase low-side switch. A protection circuit protects the integrated circuit from ground bounce and includes a first diode coupled between the power supply pin of the current sense integrated circuit and the ground pin of the integrated circuit. The power supply pin is couplable to a power supply voltage and the ground pin is couplable to ground. The first diode is oriented to allow current flow from the power supply to the ground. A first Zener diode is also coupled between the power supply pin and the ground pin in series with the first diode. The first Zener diode is oriented such that any voltage rise on the power supply pin above a normal operating voltage is clamped during ground bounce. A controller is configured to receive a sensed first phase current from the first current sense integrated circuit and to controllably operate the first phase high-side switch based at least in part on the sensed first phase current to control the operation of the electronically commutated motor.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
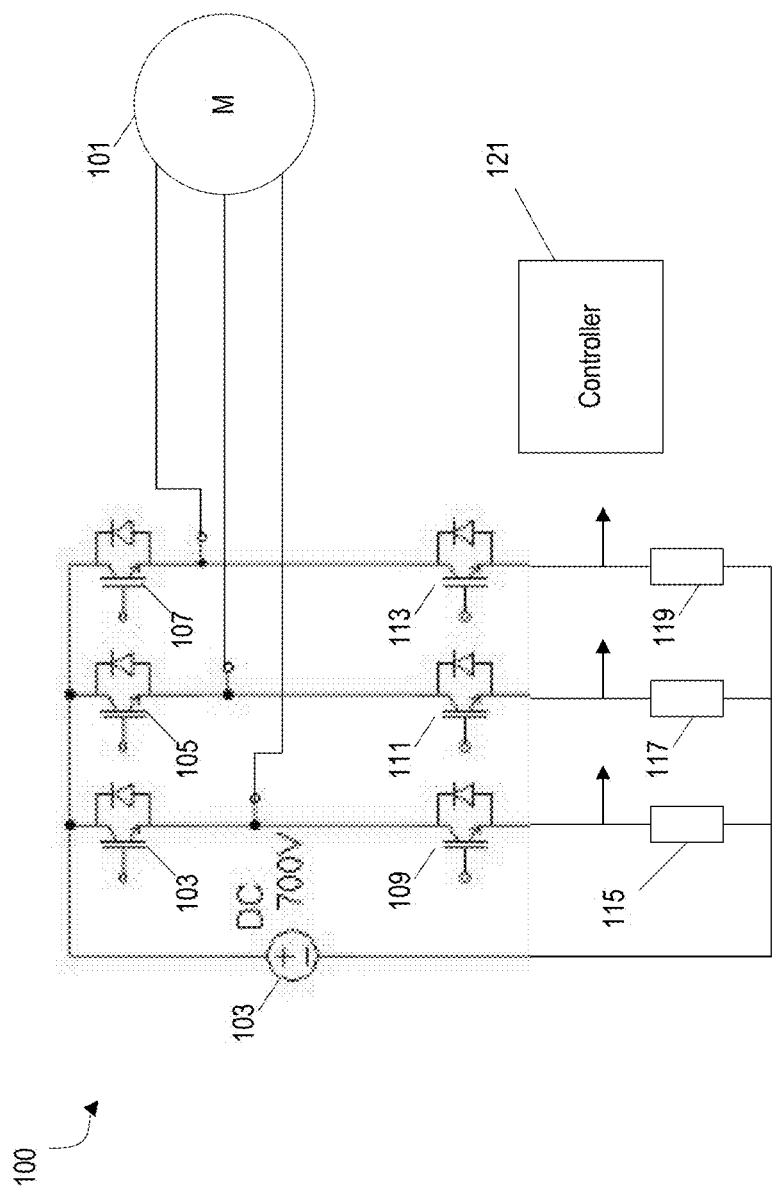
FIG. 1 is a schematic diagram of a motor control and current sense circuit according to one embodiment.

Electrically commutated motors are controlled using a drive circuit such as illustrated in FIG. 1. The drive circuit 100 of FIG. 1 provides three-phase power to commutate the motor 101. The operating parameters of the drive circuit 100 are controllably varied to adjust speed and torque of the motor as necessary. The inverter includes a plurality of controllable switches including high-side switches 103, 105, and 107 and low-side switches 109, 111, and 113. Each phase coil of the motor 101 is connected to the inverter between a high-side switch and a low-side switch. The switches are controllably opened and closed to selectively provide power from a power source 103 to each coil of the electric motor 101 and to, thereby, control the operation of the motor 101.

A series of three current sense resistors 115, 117, and 119 are coupled between each low-side switch 109, 111, and 113 and ground. A controller 121 is coupled between each low-side switch and each current sense resistor. Through this coupling, the controller 121 monitors the output current from the inverter on each line of the three-phases of the motor 101 and calculates various parameter values to maintain target speed and torque settings. The controller 121 controllably opens and closes each of the high-side switches 103, 105, and 107 and low-side switches 109, 111, and 113 to control the operation of the motor 101. Furthermore, if the monitored output current from the inverter indicates an error, the controller 121 will shut down the motor or reduce the power to provide for safe operation.

However, the construction illustrated in FIG. 1 is only capable of detecting current flowing through the three phases of the motor 101 and returning through the low-side switches 109, 111, and 113. Current that does not circulate into the low-side switches will not be sensed by the system of FIG. 1. For example, if there is a ground fault in the motor winding, the current will flow into ground and does not return through the low-side switches. The system of FIG. 1 is not able to detect such a ground fault. Furthermore, the heat generated by the current sense resistors 115, 117, and 119 results in power loss and increased ambient temperatures—particularly in high-power motor drives.

Figure 2A:
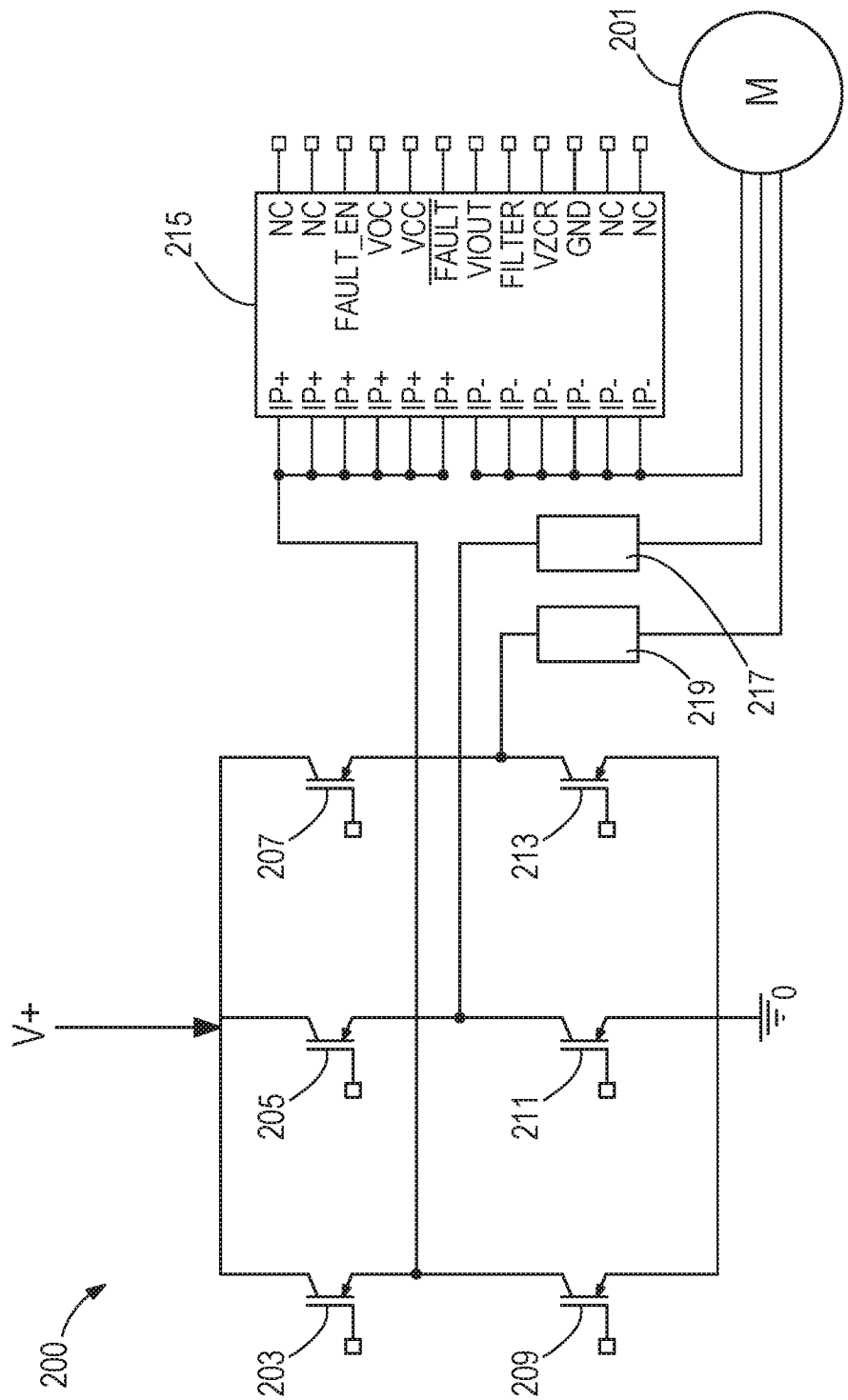
FIG. 2A is a schematic diagram of a motor control and current sense circuit according to a second embodiment.

FIG. 2A illustrates another motor control and current sense circuit 200 for use with an electronic motor 201. Like the system of FIG. 1, the system 200 includes a three-phase inverter that includes a series of three high-side switches 203, 205, and 207 and three low-side switches 209, 211, and 213. Each phase coil of the motor 201 is coupled to the inverter between a high-side switch and a low-side switch. The switches are controllably opened and closed by a controller (not pictured) to control the flow of current from a power source (V+) through a high-side switch (e.g., 203) through a phase coil of the motor 201 and back through a low-side switch (e.g., 211) to ground.

However, unlike the system of FIG. 1, system 200 does not include any current sense resistors connected between the low-side switches and ground. Instead, a current sense integrated circuit 215 is coupled between the inverter and each phase coil of the motor 201. The current sense IC 215 can include one or more of a variety of current sense ICs including, for example, the ACS709 current sense circuit manufactured by Allegro Microsystems. The current sense IC 215 measures the current of the phase coil of the motor 201 from the inverter and provides an output to a controller (not pictured). The current sense IC 215 in this example uses a Hall Effect sensor to measure the current and processes the information to generate an analog voltage corresponding to the phase current. As described, above the controller uses the measured current on each phase to control the operation of the high-side and low-side switches and to, thereby, control the operation of the electric motor 201. Furthermore, because the current sense IC is positioned in-line between the motor 201 and the inverter, it is able to also detect fault conditions such as ground fault conditions in the motor.

In the example of FIG. 2A, the system 200 includes three separate current sense ICs 215, 217, and 219 that each provide an in-line measurement of current provided to one of the motor phase coils from the inverter. However, in some alternative constructions, a single current sense IC chip can be used that receives power from each of the three high-side switches and measures the current in-line to each of the three phase coils of the motor. Furthermore, although the examples describes herein include three-phase motor control, other constructions can utilize the in-line current measurements systems and techniques with more or fewer than three phase coils in the motor 201.

The three-phase inverter motor control systems described above in reference to both FIG. 1 and FIG. 2A use a pulse-width modulated (PWM) control to generate sine waves with positive and negative half cycles like an AC waveform from a DC bus. As a result, the in-line IC based current sense circuit of FIG. 2A could potentially experience a "ground bounce" phenomenon on the secondary side of the current sense IC. A "ground bounce" occurs when the ground of the supply voltage VCC of the current sense IC dips below the ground potential causing the VCC to rise above 5 Vdc. A ground bounce can cause catastrophic failure of the IC.

Figure 2B:
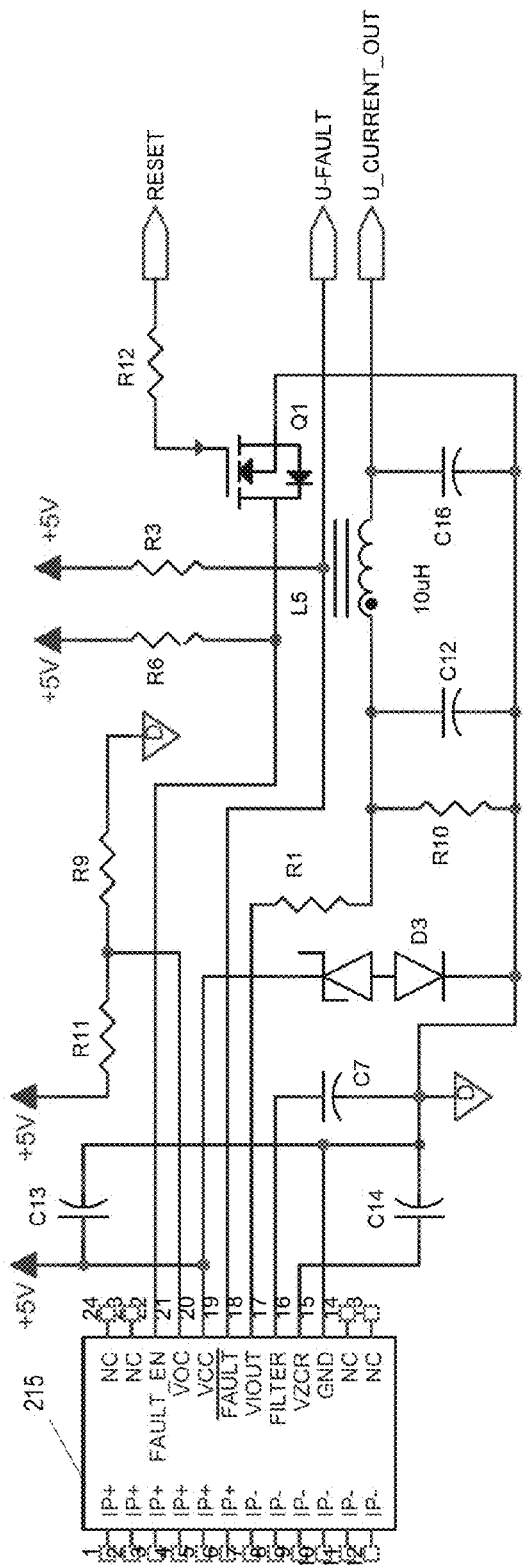
FIG. 2B is a schematic diagram of an IC protection circuit for the circuit of FIG. 2A.

FIG. 2B illustrates an IC protection circuit that protects the current sense IC 215 from damage due to the ground bounce phenomenon. The power supply pin (VCC) of the current sense IC 215 is tied to a reference voltage (+5V). It is also coupled to the ground terminal (GND) through both (1) a capacitor C13 and (2) a combination of a standard diode and a Zener diode coupled in opposing directions (D3). As a result, the ground is prevented from becoming negative.

The VIOUT pin provides a voltage representative of the measured current on the phase coil of the motor. The VIOUT pin is coupled to the controller (U_CURRENT_OUT) through a resistor R1 and an inductor L5. The node between the resistor R1 and the inductor L5 is coupled to ground through both a resistor R10 and a capacitor C12 arranged in parallel. The output (U_CURRENT_OUT) is also coupled to ground through another capacitor C16.

The open-circuit voltage pin (VOC) is coupled to a node between a first resistor R11 and a second resistor R9 arranged in series between the reference voltage (+5V) and ground. The FILTER output pin is coupled to ground through a capacitor C7 and the VZCR output pin is coupled to ground through another capacitor C14.

The FAULT output pin of the current sense IC 215 provides a flag to the controller (U-FAULT) indicating a fault condition in the circuit or the motor. The FAULT output pin is tied to a reference voltage (+5V) through a resistor R3. A RESET output from the controller can reset the current sense IC 215 by selectively opening or closing a controllable switch Q1. When the switch Q1 is open, the reference voltage (+5V) is applied to the FAULT_EN pin of the current sense IC 215 through a resistor R6. However, when the switch Q1 is closed, the reference voltage is shorted to ground through the switch Q1 and the FAULT_EN pin is brought low. In some constructions, the FAULT output pin is active low when a fault condition occurs and remains low until the controller acknowledges the faults and resets the fault condition.

Thus, the invention provides, among other things, a phase current detection and motor control system including a plurality of phase current sensors positioned to detect current flowing into the phase coil of the motor. The current sensors in some constructions are embodied in an integrated circuit that is protected from ground bounce by a protection circuit. Various features and advantages of the invention are set forth in the following claims.

What is claimed is:

1. A motor control system comprising:
   a three-phase inverter including
      a first high-side switch and a first low-side switch arranged in series between a power supply and ground, a first node between the first high-side switch and the first low-side switch being couplable to a first phase coil of an electronically commutated motor,
      a second high-side switch and a second low-side switch arranged in series between the power supply and the ground, a second node between the second high-side switch and the second low-side switch being couplable to a second phase coil of the electronically commutated motor,
      a third high-side switch and a third low-side switch arranged in series between the power supply and the ground, a third node between the third high-side switch and the third low-side switch being couplable to a third phase coil of the electronically commutated motor;
   a current sense integrated circuit including a first current sensor coupled between the first node and the electronically commutated motor, the first current sensor being configured to sense a first phase current of the electronically commutated motor;
   a second current sensor coupled between the second node and the electronically commutated motor, the second current sensor being configured to sense a second phase current of the electronically commutated motor;
   a third current sensor coupled between the third node and the electronically commutated motor, the third current sensor being configured to sense a third phase current of the electronically commutated motor;

a ground-bounce protection circuit including a first diode coupled between a power supply pin of the current sense integrated circuit and a ground pin of the court sense integrated circuit, the power supply pin being couplable to a power supply voltage, and the ground pin being couplable to the ground, the protection circuit further including a Zener diode coupled between the power supply pin and the ground pin in series with the first diode, and a controller configured to
receive a signal from the first current sensor indicative of the first phase current, a signal from the second current sensor indicative of the second phase current, and a signal from the third current sensor indicative of the third phase current, and control the three-phase inverter to control operation of the electronically commutated motor based at least in part on the signal indicative of the first phase current, the signal indicative of the second phase current, and the signal indicative of the third phase current.

2. The motor control system of claim 1, wherein the current sense integrated circuit further includes the second current sensor and the third current sensor.

3. The motor control system of claim 2, wherein the protection circuit is configured to prevent ground bounce from damaging the current sense integrated circuit.

4. The motor control system of claim 2, wherein the current sense integrated circuit is configured to provide a signal to the controller indicative of a fault condition based on the sensed first phase current.

5. The motor control system of claim 4, wherein the controller is configured to stop operation of the electronically commutated motor in response to receive the signal indicative of the fault condition from the current sense integrated circuit.

6. The motor control system of claim 2, wherein the current sense integrated circuit is configured to provide a signal to the controller indicative of a ground fault condition.

7. The motor control system of claim 2, further comprising a reset circuit coupled between the controller and the current sense integrated circuit, the reset circuit including a controllable switch coupled between a reset input pin of the current sense integrated circuit and the ground, the reset input pin being coupled to a reference voltage, the control terminal of the controllable switch being coupled to a reset output pin of the controller, and wherein the controller is configured to set the reset input pin of the current sense integrated circuit to high by opening the controllable switch and set the reset input pin of the current sense integrated circuit to low by closing the controllable switch.

8. The motor control system of claim 2, further comprising a second current sense integrated circuit including the second current sensor and a third current sense integrated circuit including the third current sensor.

9. The motor control system of claim 2, wherein the current sense integrated circuit further includes the second current sensor and the third current sensor.

10. The motor control system of claim 1, wherein the first diode being oriented to allow current flow from the power supply to the ground, and wherein the Zener diode being oriented to allow current flow in a direction opposite the current flow allowed by the first diode.

* * * * *